United States Patent
Zhang et al.

(10) Patent No.: US 12,183,053 B2
(45) Date of Patent: Dec. 31, 2024

(54) SYSTEM AND METHOD FOR PRODUCT SEARCH BY EMBEDDING VISUAL REPRESENTATION INTO TEXT SEQUENCES

(71) Applicant: Beijing Wodong Tianjun Information Technology Co., Ltd., Beijing (CN)

(72) Inventors: Chi Zhang, Fremont, CA (US); Xueying Zhang, San Jose, CA (US); Yunjiang Jiang, Mountain View, CA (US); Xiaochuan Fan, Milpitas, CA (US); Yue Shang, Sunnyvale, CA (US); Yun Xiao, Cupertino, CA (US)

(73) Assignee: Beijing Wodong Tianjun Information Technology Co., Ltd., Beijing (CN)

( * ) Notice: Subject to any disclaimer, the term of this patent is extended or adjusted under 35 U.S.C. 154(b) by 425 days.

(21) Appl. No.: 17/590,259

(22) Filed: Feb. 1, 2022

(65) Prior Publication Data
US 2023/0245418 A1 Aug. 3, 2023

(51) Int. Cl.
*G06F 16/00* (2019.01)
*G06F 16/532* (2019.01)
(Continued)

(52) U.S. Cl.
CPC .......... *G06V 10/454* (2022.01); *G06F 16/532* (2019.01); *G06F 16/954* (2019.01);
(Continued)

(58) Field of Classification Search
CPC ...... G06V 10/454; G06V 10/26; G06V 10/32; G06V 10/467; G06V 10/82; G06F 16/532; G06F 16/954
See application file for complete search history.

(56) References Cited

U.S. PATENT DOCUMENTS

| | | | |
|---|---|---|---|
| 2020/0250734 A1* | 8/2020 | Pande | G06Q 30/0631 |
| 2020/0311542 A1* | 10/2020 | Wang | G06N 3/045 |
| 2022/0277218 A1* | 9/2022 | Fan | G06N 3/08 |

OTHER PUBLICATIONS

Zhili Zhou, Kunde Lin, Yi Cao, Ching-Nung Yang, and Yuling Liu, Near-duplicate image detection system using coarse-to-fine matching scheme based on global and cocal CNN Features, Mathematics, 2020, 8(4):644.

(Continued)

*Primary Examiner* — Paul Kim
(74) *Attorney, Agent, or Firm* — Scully, Scott, Murphy & Presser, P.C.

(57) ABSTRACT

A computer-implemented method for searching a product corresponding to a query from a customer. The method includes: embedding the query to obtain a query embedding; retrieving product information having a product text and a product image; embedding the product text to obtain a product text embedding, embedding the product image to obtain a product image embedding, and combining the product text embedding and the product image embedding to obtain a product embedding, where the product image embedding has a same format as the product text embedding; subjecting the query embedding and the product embedding to a transformer to determine whether the query and the product are relevant; and providing the product as a search result of the query when the query and the product are relevant.

11 Claims, 9 Drawing Sheets

(51) Int. Cl.
    *G06F 16/954*    (2019.01)
    *G06V 10/26*     (2022.01)
    *G06V 10/32*     (2022.01)
    *G06V 10/44*     (2022.01)
    *G06V 10/46*     (2022.01)
    *G06V 10/82*     (2022.01)

(52) U.S. Cl.
    CPC .............. *G06V 10/26* (2022.01); *G06V 10/32* (2022.01); *G06V 10/467* (2022.01); *G06V 10/82* (2022.01)

(56) References Cited

OTHER PUBLICATIONS

Ryan McDonald, George Brokos, and Ion Androutsopoulos, Deep relevance ranking using enhanced document-query Interactions, Proceedings of the Conference on Empirical Methods in Natural Language Processing (EMNLP 2018), 2018.

Ashish Vaswani, Noam Shazeer, Niki Parmar, Jakob Uszkoreit, Llion Jones, Aidan N. Gomez, Lukasz Kaiser, Illia Polosukhin, Attention is all you need, Neural Information Processing Systems, 2017, 30:5998-6008.

Lu, Jiasen and Batra, Dhruv and Parikh, Devi and Lee, Stefan, ViLBERT: pretraining task-agnostic visiolinguistic representations for vision-and-language tasks, arXiv:1908.02265, 2019.

Liunian Harold Li, Mark Yatskar, Da Yin, Cho-Jui Hsieh, and Kai-Wei Chang, Visualbert: a simple and performant baseline for vision and language, arXiv:1908.03557, 2019.

Weijie Su, Xizhou Zhu, Yue Cao, Bin Li, Lewei Lu, Furu Wei, Jifeng Dai, VL-BERT: pre-training of generic visual-linguistic representations, arXiv:1908.08530, 2020.

* cited by examiner

FIG. 7

SYSTEM AND METHOD FOR PRODUCT SEARCH BY EMBEDDING VISUAL REPRESENTATION INTO TEXT SEQUENCES

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to e-commerce, and more particularly to systems and methods for extending product search engine in e-commerce by embedding visual representations into text sequences.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In an e-commerce platform, a customer often searches product database to retrieve products that match his search query. An e-commerce platform lacks product search function is unfavorable to the customers, and can degrade the customers' shopping experiences. When the search function is available, accuracy of the search result is critical and mismatched search result not only degrades the customer's shopping experience, but also results in biased ranking algorithms and brings noisy behavioral feedback such as clicks or purchases in the search logs. The existing search engine may utilize product title, product descriptions, and user profile information to retrieve products that match the query, but search performed based on these information often results in inaccurate search result.

Therefore, an unaddressed need exists in the art to address the aforementioned deficiencies and inadequacies.

SUMMARY

Product images carry more description information, and are one of the key factors that drive conversions in e-commerce. The main image of a product, which is carefully designed, selected and uploaded by the seller, carries much more information than we can imagine. For example, a cloth image can easily tell people of its color, texture and styling which can be more useful than thousands of description words. Therefore, in certain aspects, the present disclosure uses product image, in addition to the product title, product descriptions, and user profile information, to retrieve products that match a query. In certain embodiments, the present disclosure (1) extracts image features from the product image and approximates the image feature to texture feature; (2) designs and implemented an end-to-end relevance model between query and product information. The relevance model can accept dynamic inputs from text, from an image, or from the combination of the text and the image.

In certain aspects, the present disclosure relates to a computer-implemented method for searching a product corresponding to a query from a customer. In certain embodiments, the method includes:

embedding the query to obtain a query embedding;

retrieving product information comprising a product text and a product image;

embedding the product text to obtain a product text embedding, embedding the product image to obtain a product image embedding, and combining the product text embedding and the product image embedding to obtain a product embedding, where the product image embedding has a same format as the product text embedding;

subjecting the query embedding and the product embedding to a transformer to determine whether the query and the product are relevant; and providing the product as a search result of the query when the query and the product are relevant.

In certain embodiments, both the query embedding the product embedding are in a form of vectors. In certain embodiments, the query is a text, and the product image embedding has a same format as the query embedding.

In certain embodiments, the transformer includes a query transformer for processing the query embedding and a product transformer for processing the product embedding. In certain embodiments, both the query embedding and the product embedding are subjected to the same transformer. In certain embodiments, the transformer or transformers update the query embedding and the product embedding, and the relevance between the query and the produce are determined based on the updated query embedding and the product embedding.

In certain embodiments, the query includes a query text and a query image, and the query embedding includes a query text embedding corresponding to the query text and a query image embedding corresponding to the query image. In certain embodiments, the query only include a query text, but not a query image.

In certain embodiments, the step of embedding the product image includes: normalizing the product image to obtain a normalized product image; splitting the normalized product image into a plurality of grids; concatenating the plurality of grids into a sequence of grids; and extracting product image feature from the sequence of grids to obtain a grid token for each of the sequence of grids. In certain embodiments, the normalization includes convert pixel intensity values to a range of −1 to 1. In certain embodiments, the normalized product image is split into 4×4 grids. In certain embodiments, the concatenation is performed by placing the first row of grids in sequence, and followed by placing the next row of grids in sequence. In certain embodiments, the product image feature extraction or is performed using a convolutional neural network (CNN).

In certain embodiments, the step of embedding the product image further includes: adding a position vector to each of the grid tokens, the position vectors representing positions of the grids in the sequence of grids; adding a segment vector to each of the grid tokens, the segment vectors representing identification of the product image; adding a mask vector to each of the grid tokens, where values of the mask vectors are 0 or 1, and value of one of the grid tokens is converted to 0 when the value of corresponding one of the mask vectors is 0; and defining a category identification, the category identification representing category of the product in an e-commerce platform. The product embedding includes the grid tokens, the position vectors, the segment vectors, the mask vectors, and the category identification. In certain embodiments, the category of the product is directly retrieved from the product information stored at a product database. In certain embodiments, the category of the product may also be inferred from the product image.

In certain embodiments, about 10-15% of the mask vectors have a value of 0. In certain embodiments, the mask vectors have the value of 0 are defined randomly.

In certain embodiments, the step of extracting the product image feature from the sequence of grids is performed using CNN on each of the grids, and the transformer is a pre-trained bidirectional encoder representations from transformers (BERT).

In certain embodiments, the step of embedding the product text includes tokenizing the product text, and adding position vectors, segment vectors, and mask vectors to the tokenized product text. In certain embodiments, the query includes a query text, and the step of embedding the query text includes tokenizing the query text, and adding position vectors, segment vectors, and mask vectors to the tokenized query text. In certain embodiments, the tokenization of the product text or the query text is performed using word2vec, GloVe, or fastTex.

In certain embodiments, for each query, the method is performed for all the products in the product database or a category of products in the product database, so that the customer can receive a list of products as the query result.

In certain embodiments, the method further includes transmitting the query result to a terminal of the customer, and displaying the query result on the terminal. The terminal may be, for example a screen of a computer or a smart phone.

In certain aspects, the present disclosure relates to a system for searching a product corresponding to a query provided by a customer. In certain embodiments, the system includes a computing device, the computing device has a processor and a storage device storing computer executable code. The computer executable code, when executed at the processor, is configured to:
  embed the query to obtain a query embedding;
  retrieve product information comprising a product text and a product image;
  embed the product text to obtain a product text embedding, embed the product image to obtain a product image embedding, and combine the product text embedding and the product image embedding to obtain a product embedding, where the product image embedding has a same format as the product text embedding;
  subject the query embedding and the product embedding to a transformer to determine whether the query and the product are relevant; and
  provide the product as a search result of the query when the query and the product are relevant.

In certain embodiments, both the query embedding the product embedding are in a form of vectors. In certain embodiments, the query is a text, and the product image embedding has a same format as the query embedding.

In certain embodiments, the transformer includes a query transformer for processing the query embedding and a product transformer for processing the product embedding. In certain embodiments, both the query embedding and the product embedding are subjected to the same transformer. In certain embodiments, the transformer or transformers update the query embedding and the product embedding, and the relevance between the query and the produce are determined based on the updated query embedding and the product embedding.

In certain embodiments, the query includes a query text and a query image, and the query embedding includes a query text embedding corresponding to the query text and a query image embedding corresponding to the query image. In certain embodiments, the query only include a query text, but not a query image.

In certain embodiments, the computer executable code is configured to embed the product image by: normalizing the product image to obtain a normalized product image; splitting the normalized product image into a plurality of grids; concatenating the plurality of grids into a sequence of grids; and extracting product image feature from the sequence of grids to obtain a grid token for each of the sequence of grids. In certain embodiments, the normalization includes convert pixel intensity values to a range of −1 to 1. In certain embodiments, the normalized product image is split into 4×4 grids. In certain embodiments, the concatenation is performed by placing the first row of grids in sequence, and followed by placing the next row of grids in sequence. In certain embodiments, the product image feature extraction or is performed using a convolutional neural network (CNN).

In certain embodiments, the computer executable code is further configured to embed the product image by: adding a position vector to each of the grid tokens, the position vectors representing positions of the grids in the sequence of grids; adding a segment vector to each of the grid tokens, the segment vectors representing identification of the product image; adding a mask vector to each of the grid tokens, where values of the mask vectors are 0 or 1, and value of one of the grid tokens is converted to 0 when the value of corresponding one of the mask vectors is 0; and defining a category identification, the category identification representing category of the product in an e-commerce platform. The product embedding includes the grid tokens, the position vectors, the segment vectors, the mask vectors, and the category identification.

In certain embodiments, about 10-15% of the mask vectors have a value of 0. In certain embodiments, the mask vectors have the value of 0 are defined randomly.

In certain embodiments, the computer executable code is further configured to extract the product image feature from the sequence of grids using CNN on each of the grids, and the transformer is a pre-trained bidirectional encoder representations from transformers (BERT).

In certain embodiments, the computer executable code is configured to embed the product text by tokenizing the product text, and adding position vectors, segment vectors, and mask vectors to the tokenized product text. In certain embodiments, the query includes a query text, and the computer executable code is configured to embed the query text by tokenizing the query text, and adding position vectors, segment vectors, and mask vectors to the tokenized query text. In certain embodiments, the tokenization of the product text or the query text is performed using word2vec, GloVe, or fastTex.

In certain embodiments, for each query, computer executable code is configured to process all the products in a product database or a category of products in the product database, so that the customer can receive a list of products as the query result.

In certain embodiments, the computer executable code is further configured to transmit the query result to a terminal of the customer, and displaying the query result on the terminal. The terminal may be, for example a screen of a computer or a smart phone.

In certain aspects, the present disclosure relates to a non-transitory computer readable medium storing computer executable code. The computer executable code, when executed at a processor of a computing device, is configured to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

FIG. 7 schematically depicts product image embedding according to certain embodiments of the present disclosure.

DETAILED DESCRIPTION

Figure 1:
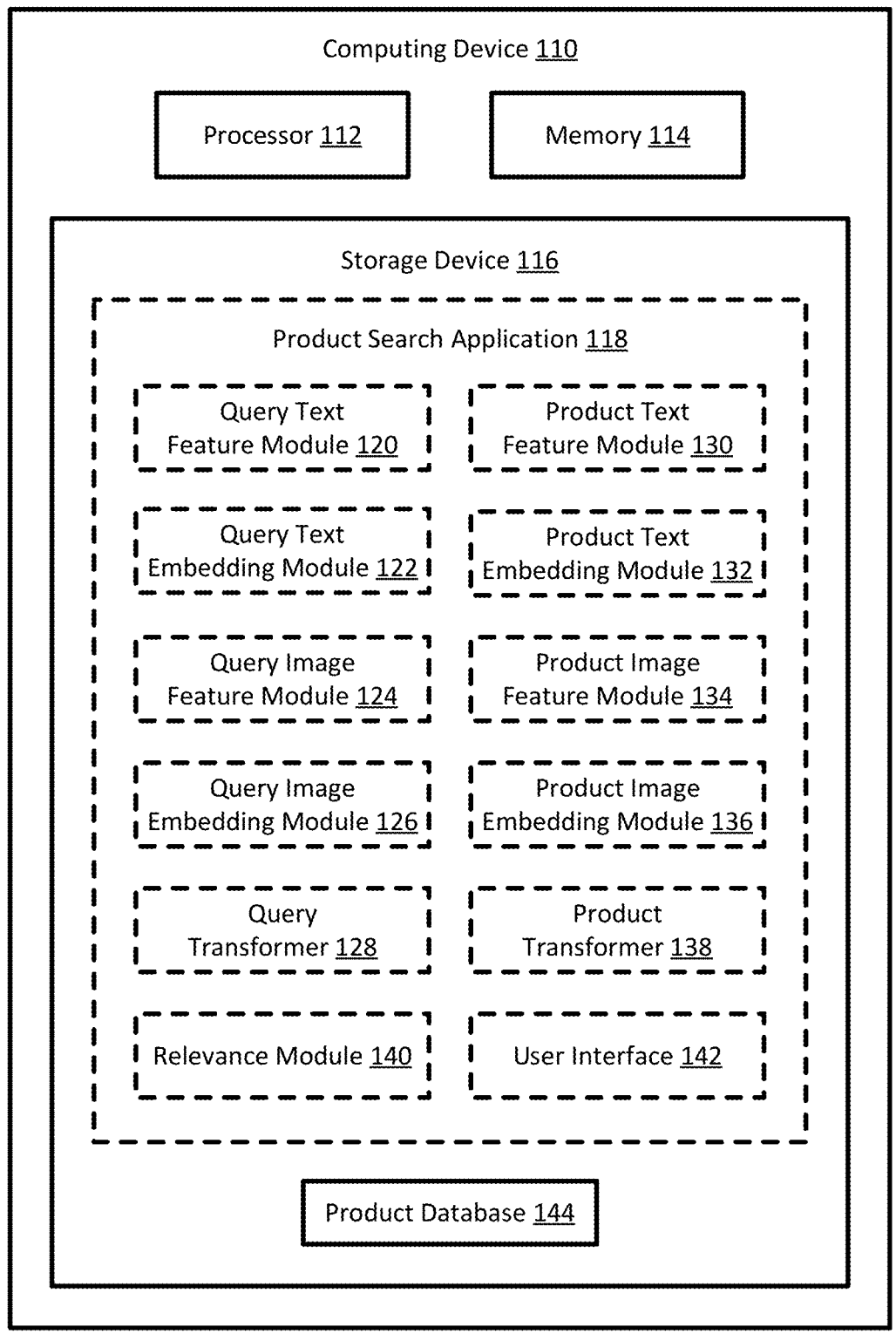
FIG. 1 schematically depicts a product search system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. As used herein, "plurality" means two or more. As used herein, the terms "comprising", "including", "carrying", "having", "containing", "involving", and the like are to be understood to be open-ended, i.e., to mean including but not limited to.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof. The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In certain aspects, the present disclosure provides multi-modality visual-language models. In certain embodiments, the concatenation sequence between text feature and image feature is fed into a machine learning model, such as a transformer encoder model. Good results can be reached using such a method in fields such as visual question and answers, matches between text and image, and so on. Region of interests (RoIs) from an image serve a similar role as language "word token" to represent "instance-level" information from the images. Series of RoIs from the image are considered as "sentences" in language. Once the image features are extracted and treated as language features, they are concatenated with text feature and fed into a language model. However, there are three limitations for such a feature extraction method: 1) RoIs tend to provide "instance-level" rather than fine-grained information. There may be no matching image regions for product property descriptions. 2) too many over-laps between different RoIs. These RoIs give similar features and contribute little in modelling. 3) Without knowing the object inside the images, RoIs seem to be noisy and can result in invalid tokens.

In certain aspects, the present disclosure provides an improved multi-modality model. FIG. 1 schematically depicts a product query system according to certain embodiments of the present disclosure. As shown in FIG. 1, the system 100 includes a computing device 110. In certain embodiments, the computing device 110 may be a server computer, a cluster, a cloud computer, a general-purpose computer, or a specialized computer, which provides product search service. In certain embodiments, the computing device 110 may communicate with other computing devices or services, so as to obtain product information, and place product orders. The product information may include title, description, main image, and optionally other images of the product. In certain embodiments, the communication is performed via a network, which may be a wired or wireless network, and may be of various forms, such as a public network and a private network, or via non-transitory computer media including but not limited to flash drive, USB drives, hard drive, floppy disk, SD card, optical drive, or any other portable data storage media.

As shown in FIG. 1, the computing device 110 may include, without being limited to, a processor 112, a memory 114, and a storage device 116. In certain embodiments, the computing device 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices. The processor 112 may be a central processing unit (CPU) which is configured to control operation of the computing device 110. The processor 112 can execute an operating system (OS) or other applications of the computing device 110. In some embodiments, the computing device 110 may have more than one CPU as the processor, such as two CPUs, four CPUs, eight CPUs, or any suitable number of CPUs. The memory 114 can be a volatile memory, such as the random-access memory (RAM), for storing the data and information during the operation of the computing device 110. In certain embodiments, the memory 114 may be a volatile memory array. In certain embodiments, the computing device 110 may run on more than one memory 114. The storage device 116 is a non-volatile data storage media for storing the OS (not shown) and other applications of the computing device 110. Examples of the storage device 116 may include non-volatile memory such as flash memory, memory cards, USB drives, hard drives, floppy disks, optical drives, solid-state drive (SSD) or any other types of data storage devices. In certain embodiments, the storage device 116 may be a local storage, a remote storage, or a cloud storage. In certain embodiments, the computing device 110 may have multiple storage devices 116, which may be identical storage devices or different types of storage devices, and the applications of the computing device 110 may be stored in one or more of the storage devices 116 of the computing device 110. In certain embodiments, the computing device 110 is a cloud computer, and the processor 112, the memory 114 and the storage device 116 are shared resources provided over the Internet on-demand.

As shown in FIG. 1, the storage device 116 includes a product search application 118 and a product database 144. The product search application 118 is configured to provide a product search interface for customers, such that the customers can use text, image, or the combination of text and image as a query to search one or multiple products. The searched products match the query content. The product database 144 includes information of the product, such as title, description, main image, and optionally other text or images of the product. In certain embodiments, the product database 144 may also be stored in a remote computing device in communication with the computing device 110, as long as the product database 144 is accessible to the product search application 118. The product search application 118 includes, among other things, a query text feature module 120, a query text embedding module 122, a query image feature module 124, a query image embedding module 126, a query transformer 128, a product text feature module 130, a product text embedding module 132, a product image feature module 134, a product image embedding module 136, a product transformer 138, a relevance module 140, and a user interface 142. In certain embodiments, the product search application 118 may include other applications or modules necessary for its operation. It should be noted that the modules are each implemented by computer executable codes or instructions, or data table or databases, which collectively forms one application. In certain embodiments, each of the modules may further include sub-modules.

Alternatively, some of the modules may be combined as one stack. In certain embodiments, the query image feature module 124 and the query image embedding module 126 may not be necessary, where the customers only use text for the querying process. In certain embodiments, certain modules may be implemented as a circuit instead of executable code. In certain embodiments, some or all of the modules of the product search application 118 may be located at a remote computing device or distributed in a cloud.

The query text feature module 120 is configured to receive a query text, extract query text feature from the received query text, and send the query text feature to the query text embedding module 122. In certain embodiments, the query text feature module 120 is configured to receive the query text from the user interface 142, where the customers can input the query text via the user interface 142. In certain embodiments, the extraction of the query text feature is performed by embedding the query text to text token embeddings, such as using Word2Vec by Google, GloVe by Stanford, fastTex by Facebook, or other type of pre-trained word embedding models. In certain embodiments, the embedding of the query text to the text token embedding is performed using a customized lookup table based on a pre-trained word embedding model, where the pre-trained word embedding model is further fine-tuned using e-commerce text. In certain embodiments, the obtained text token embeddings are in the form of vectors, and each vector corresponds to one word in the query text. In certain embodiment, when one or more punctuations exist in the query text, the text token embeddings may also include a vector corresponding to each punctuation. In certain embodiments, [CLS] may be added as the start of the query text, and [SEP] may be added between sentences of the query text and at the end of the query text. The dimensions of the vectors may vary, and could be, for example, 1024 dimensions or 768 dimensions, and each dimension may be a float value.

The query text embedding module 122 is configured to, upon receiving the extracted query text feature, embed the query text feature to query text embeddings, and send the query text embeddings to the query transformer 128. In certain embodiments, the query text embedding module 122 is configured to perform the embedding by adding segment embeddings, position embeddings, and optionally mask embeddings to the text token embeddings. The segment embeddings indicate the identification of the sentence of the text word. For example, if the query text has two sentences, the words in the first sentence may have one segment embedding, such as 1; and the words in the second sentence may have another segment embedding, such as 2. The position embeddings indicate the position of the words in the query text. For example, if the query text have ten words sequentially, the ten words may have position embeddings of 0, 1, 2, 3, . . . , 7, 8, and 9, respectively.

Figure 2:
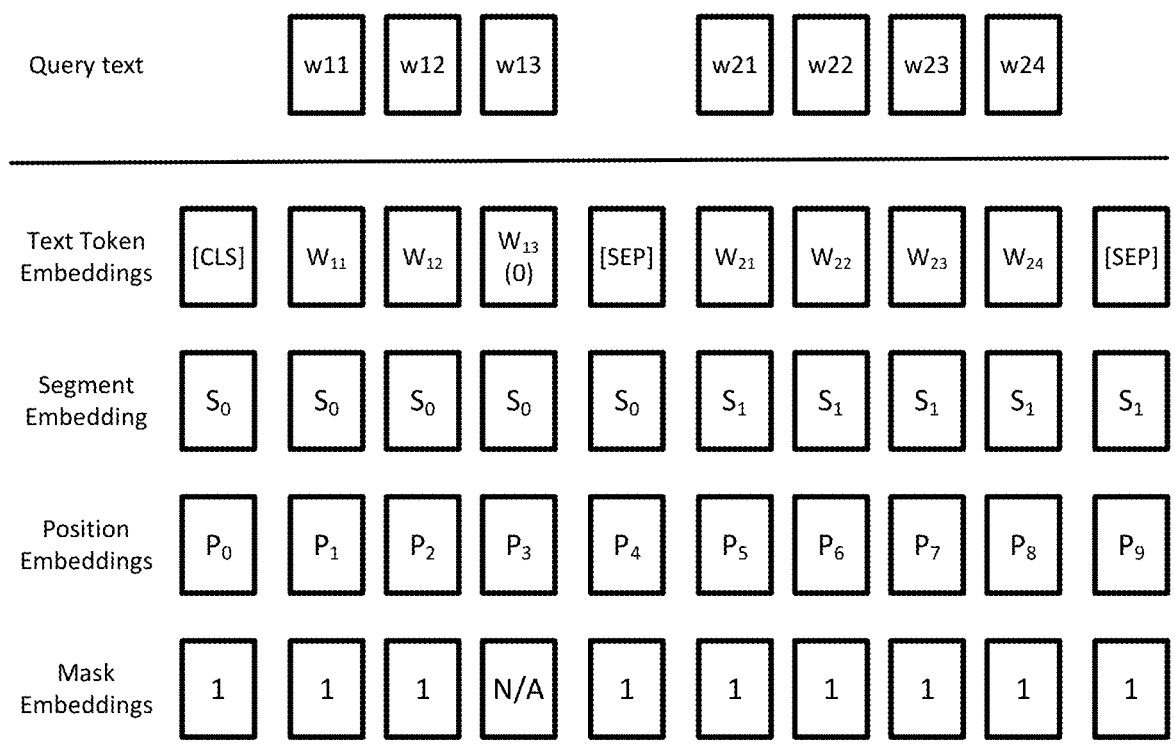
FIG. 2 schematically depicts an example of query text embedding according to certain embodiments of the present disclosure.

FIG. 2 schematically shows an example of query text embeddings of a query text according to certain embodiments of the present disclosure. As shown in FIG. 2, the query text includes two sentences. The first sentence has three words w11, w12, and w13, and the second sentence has four words w21, w22, w23, and w24. After performance of the query text feature module 120, the result is the text token embeddings. After performance of the query text embedding module 122, the result includes the text token embeddings, the segment embeddings, the position embeddings, and the mask embeddings.

The query image feature module 124 and the query image embedding module 126 are configured to mimic the function of the query text feature module 120 and the query text embedding module 122, where a query image is processed instead of a query text. The query image feature module 124 is configured to receive a query image, for example from the user interface 142, extract query image feature (query image token embeddings), and send the query image feature to the query image embedding module 126. The query image embedding module 126 is configured to, upon receiving the query image feature, add segment embeddings, position embeddings, and mask embeddings to the query image feature to form query image embeddings, and provide the query image embeddings to the query transformer 128. The query image feature module 124 and the query image embedding module 126 are optional, have similar module structure and function as the product image feature module 134 and the product image embedding module 136, and will be described below in detail in regard to the product image feature module 134 and the product image embedding module 136.

The query transformer 128 is configured to, upon receiving the query embeddings (query text embeddings and optionally the query image embeddings), run a transformer model using the query embeddings as input, so as to update the query embeddings, and provide hidden feature of the updated query embeddings to the relevance module 140. In certain embodiments, the query transformer 128 has a bidirectional encoder representations from transformers (BERT) structure. In certain embodiments, the query transformer 128 has 3-12 BERT layers. In one example, the query transformer 128 has three BERT layers to ensure efficiency of the system.

The product text feature module 130 is configured to retrieve a product text, extract product text features (text token embeddings) from the product text, and provide the product text features to the product text embedding module 132. The product text embedding module 132 is configured to, upon receiving the product text feature, add segment embeddings, position embeddings, and optionally mask embeddings to the product text feature, so as to form product text embedding, and provide the product text embeddings to the product transformer 138. The structure and function of the product text feature module 130 and the product text embedding module 132 are substantially the same as the query text feature module 120 and the query text embedding module 122, except that the input of the product text feature module 130 is title and description of the product from the product database 144, while the input of the query text feature module 120 is the query text received from the user interface 142.

Figure 3:
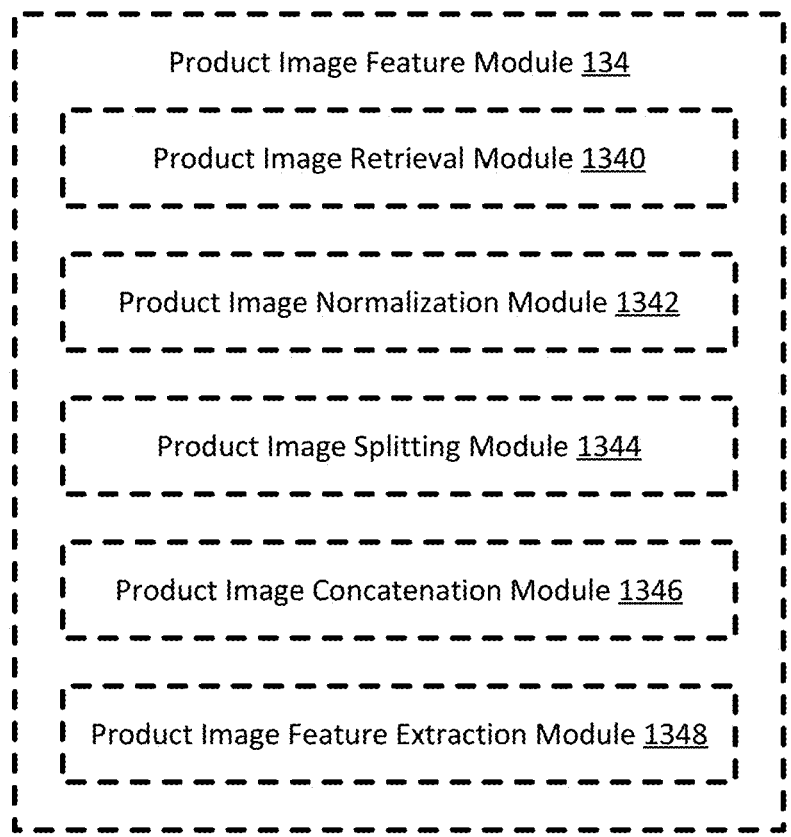
FIG. 3 schematically depicts a product image feature module according to certain embodiments of the present disclosure.

The product image feature module 134 is configured to retrieve a product image from the product database 144, extract product image feature (product image token embeddings) from the product image, and send the product image feature to the product image embedding module 136. FIG. 3 schematically depicts the product image feature module 134 according to certain embodiments of the present disclosure. As shown in FIG. 3, the product image feature module 134 includes a product image retrieval module 1340, a product image normalization module 1342, a product image splitting module 1344, a product image concatenation module 1346, and a product image feature extraction module 1348.

The product image retrieval module 1340 is configured to retrieve a product image, such as the product main image, from the product database 144, and send the retrieved product image to the product image normalization module 1342. In certain embodiments, the product image retrieval module 1340 may coordinate with the product text feature module 130 to retrieve the text and the main product image of the same product substantially at the same time. The product main image may be an RGB image, each pixel in the RGB image has three channels corresponding to red, green and blue, respectively. Each channel may have a value in the range of 0-255 indicating the intensity of the pixel in red, green, or blue.

The product image normalization module 1342 is configured to, upon receiving the retrieved product main image, normalize the product main image to obtain a normalized product image, and send the normalized product image to the product image splitting module 1344. In certain embodiments, the normalization may be performed by converting each 0-255 intensity value to a float value in the range of −1 to 1. In certain embodiments, the conversion from the [0-255] intensity values to the [−1, 1] intensity values is performed by:

$$I_{[-1,1]} = \frac{2I_{[0,255]}}{255} - 1,$$

where $I_{[0,255]}$ is the intensity value in the range of [0-255], and $I_{[-1,1]}$ is the corresponding intensity value in the range of [−1, 1]. In certain embodiments, the distribution of the intensities in the normalized map has a Gaussian distribution. The normalized product image has all the pixels, each pixel has three channels, and the value for each of the three channels is the corresponding normalized intensity. In certain embodiments, the product image normalization module 1342 may use other type of normalization methods.

The product image splitting module 1344 is configured to, upon receiving the normalized product image, split the normalized product image into grids, and send the grids to the product image concatenation module 1346. In certain embodiments, the image is cut into fixed square or rectangular non-overlapping grid patches. In certain embodiments, the normalized product image is cut into 2×2, or 3×3, or 4×4, ... or 16×16 grids. In certain embodiments, the normalized product image is split into 16 (4×4) grids. In certain embodiments, the number of splits along the horizontal direction and vertical direction of the product image may not be the same.

The product image concatenation module 1346 is configured to, upon receiving the grids of the product image, flatten and concatenate the grids to form a sequence of grids, and send the sequence of grids to the product image feature extraction module 1348. In certain embodiments, the grids are aligned from left to right, and from top down. In other words, the sequence of grids starts from the first row of grids from left to right, then the second row of grids from left to right, until the last row of grids from left to right.

Figure 4:
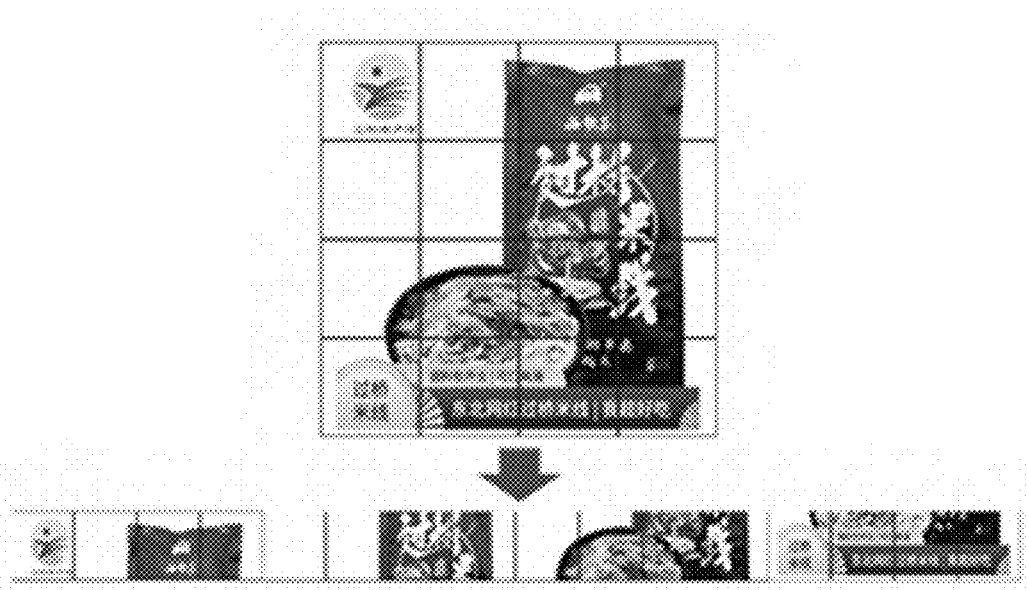
FIG. 4 schematically depicts splitting of a product image and concatenating of split grids according to certain embodiments of the present disclosure.

FIG. 4 schematically depicts splitting of a normalized product image into grids and concatenating of the grids into a sequence of grids according to certain embodiments of the present disclosure. As shown in FIG. 4, the product image is split into a total of 16 grids, which includes four rows of grids, and each row has four grids. The 16 grids are then aligned from left to right, from the first row to the fourth row, to form a sequence of 16 grids. Each grid can be regarded as a word in natural language processing (NLP), and the sequence of grids mimics the structure of a sentence. Therefore, the sequence of 16 grids shown in FIG. 4 can be regarded as a sentence of 16 words. In certain embodiments, the concatenation may be performed in other ways, for example, the sequence of grids can start from the first column of grids from top down, then the second column of grids from top down, until the last column of grids. However, the ways for concatenating the grids should be consistent during training and using of the product search application 118.

The product image feature extraction module 1348 is configured to, upon receiving the sequence of grids from the product image concatenation module 1346, extract features from the sequence of grids to obtain product image sequence feature, and send the product image sequence feature to the product image embedding module 136. In certain embodiments, the feature extraction is performed using a convolutional neural network (CNN) or a transformer model. Specifically, each grid is used as an input of the CNN, each grid include multiple pixels, each pixel has its normalized intensities. The output of the CNN for each grid can be a vector, and the vector has a series of float numbers denoting the feature of the image grid. Each float number is a dimension of the vector, and the number of dimensions may be based on the configuration of the CNN models. In certain embodiments, the CNN model is RESNET50 and the number of dimensions is for example 512, 1024 or 2048. In certain embodiments, the feature extraction model is vision transformer (VIT), and the dimension for example may be 768. Kindly note that the dimensions may vary, and can be adjusted by a multilayer perceptron (MLP) at the last layer. By the above tokenization in the image field, the tokenization mimics the tokenization of text in NLP. In certain embodiments, the dimensions of the extracted product image feature is the same as the dimension of the extracted product text feature. In certain embodiments, the dimensions of each of the product text feature and image feature is also the same as the dimensions of the query text feature.

Kindly note that a key to perform the cross-modal search is to approximate image features as text features. The image of the product is split into non-overlapping grid patches. Image features extracted via CNN for each grid patch serves as a word token in NLP. The flattening of the grid patches feature after position embedding is considered as a sentence in NLP. Once both features are aligned together, cross-modality search is able to conduct.

Figure 5:
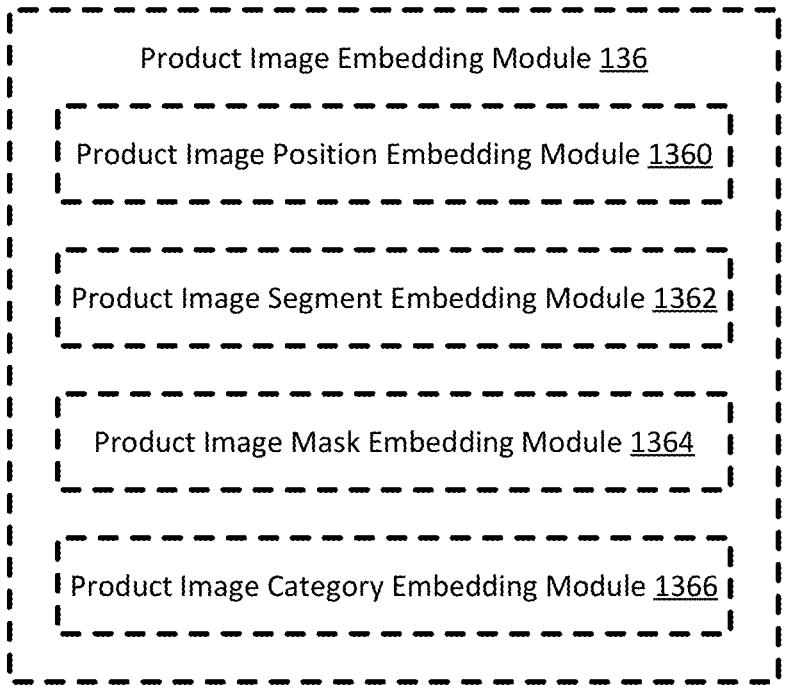
FIG. 5 schematically depicts a product image embedding module according to certain embodiments of the present disclosure.

FIG. 5 schematically depicts structure of the product image embedding module 136. As shown in FIG. 5, the product image embedding module 136 includes a product image position embedding module 1360, a product image segment embedding module 1362, a product image mask embedding module 1364, and a product image category embedding module 1366. As described previously, the product image embedding module 136 basically has the same structure and function as the query image embedding module 126. The difference is that the query image embedding module 126 processes an image provided by a customer, such as an image taken by the customer using a smart phone and uploaded to the product search application 118 through the user interface 142, while the product image embedding module 136 processes a product image retrieved from the product database 144. Further, the product image embedding module 136 has the product image category embedding module 1366, while the query image embedding module 126 may not have a category embedding module.

Figure 6:
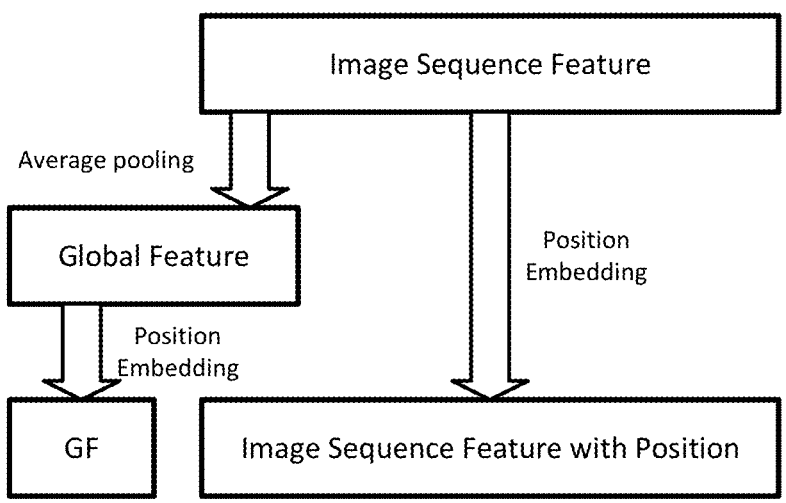
FIG. 6 schematically depicts global feature of an image according to certain embodiments of the present disclosure.

The product image position embedding module 1360 is configured to, upon receiving the product image sequence feature (or product image feature) from the product image feature extraction module 1348, add position embeddings to the product image feature, and send the product image feature and the position embeddings to the product image segment embedding module 1362. In NLP field, each word is first mapped into a series of float numbers, which is called a word token or a word feature. In order to let a model understand a piece of article, only a sequence of word feature is not enough. Positions of the words in a sentence is also critical. The same word in different positions gives different meanings. Position embedding is to embed these positions information into the sequence of word features. To mimic the image processing to text processing, the present disclosure adds position information for the image grids. The product image feature includes vectors for the grids sequentially, and the position embedding is to add a position vector to each grid vector. In certain embodiments, the position vector is defined by four numerical values representing the location of the grids in the image. For example, the upper left corner and the lower right corner of the image can be defined to have a coordinates of (0, 0) and (1, 1) respectively. Each grid is then defined by the coordinates of its upper left corner and the lower right corner. Assuming there are 16 girds of the image, four in horizontal direction and four in vertical direction. Then for the first row of four grids in a 4×4 grids, the position vectors are respectively (0, 0, 0.25, 0.25), (0.25, 0, 0.5, 0.25), (0.5, 0, 0.75, 0.25), and (0.75, 0, 1.0, 0.25), and for the fourth row of four grids in the 4×4 grids, the position vectors are respectively (0, 0.75, 0.25, 1.0), (0.25, 0.75, 0.5, 1.0), (0.5, 0.75, 0.75, 1.0), and (0.75, 0.75, 1.0, 1.0). In certain embodiments, different from position embedding for the text, the product image position embedding module 1360 is further configured to define a global feature of the whole image, and add the global feature at the start of the 16 grids. As shown in FIG. 6, in certain embodiments, the global feature is generated by averaging all the grid features, and the position of the global feature is defined as (0, 0, 1, 1)-the center of the normalized image. In other words, the global feature is a vector, the value of the global feature vector is the average of the 16 image grid vectors, and the position embedding of the global feature vector is (0, 0, 1, 1).

The product segment embedding module 1362 is configured to, upon receiving the product image feature and the position embeddings from the product image position embedding module 1360, add segment embeddings to the product image sequence feature, and send the product image feature, the position embeddings, and the segment embeddings to the product image mask embedding module 1364. Since one image is considered as one sentence, all the girds features are assigned the same segment identification (ID). Specifically, in NLP, positions of the sentences in an article matters. Segmentation embedding in NLP assigns different labels for different sentences. Similarly, for image processing, the product segment embedding module 1362 is configured to assign a segment ID for each of the product images. When only the product main image is used in the product search application 118, there is only one image segment ID. The image segment ID is used to differentiate the image from the text sentences. For example, for an product, if two sentences and one product main image are provided, the segment ID for the two sequences and the product main image can be defined as 0, 1, and 2, respectively.

The product image mask embedding module 1364 is configured to, upon receiving the product image feature, the position embeddings, and the segment embeddings from the product image segment embedding module 1362, add mask embeddings to the product image feature, and send the product image feature, the position embeddings, the segment embeddings, and the image mask embeddings to the product image category embedding module 1366. As described above, the product image feature is in a form of a series of vectors, and each vector represents one of the grids. In order to learn the relationship among the grids, the product image mask embedding module 1364 is configured to add a mask embedding to each of the vectors. In certain embodiments, 10%-15% of the masks with random position is assigned to N/A. A vector with mask token equaling N/A is converted to 0 at each of its dimension. The other vectors are used to predict the masked image sequence feature. The more accuracy the model predicts, the more the model learns.

The product image category embedding module 1366 is configured to, upon receiving the product image feature, the position embeddings, the segment embeddings, and the mask embeddings from the product image mask embedding module 1364, add a category embedding to the product image feature, and send the product image feature, the position embeddings, the segment embeddings, the mask embeddings, and the category embedding to the product transformer 138. In certain embodiments, in the field of e-commerce, images from different categories of products carry different information. Garment image in fashion field generally carries more useful information than electronics images. Descriptions of how large a hard-drive is can't be reflected in the image, but the texture description and the style description of a garment can be easily founded in its image. To emphasis the differences for different categories of products, the product image category embedding module 1366 is configured to add a category ID for the product image sequence feature. In certain embodiments, the products are classified to about 41 different categories, which may include apparel, electronics, home furnishings, home appliances, computer, etc. In certain embodiments, the product image feature, the position embeddings, the segment embeddings, and the mask embeddings are subjected to a MLP with the category ID as a parameter, and the result is used as the input of the product transformer 138. Kindly note that the query image embedding module 126 may not have a corresponding product image category embedding module. In certain embodiments, the product image embedding module 136 may not include the product image category embedding module 1366, and the product transformer 138 is configured to add the category ID before operating the transformer using the product embeddings.

Figure 7:
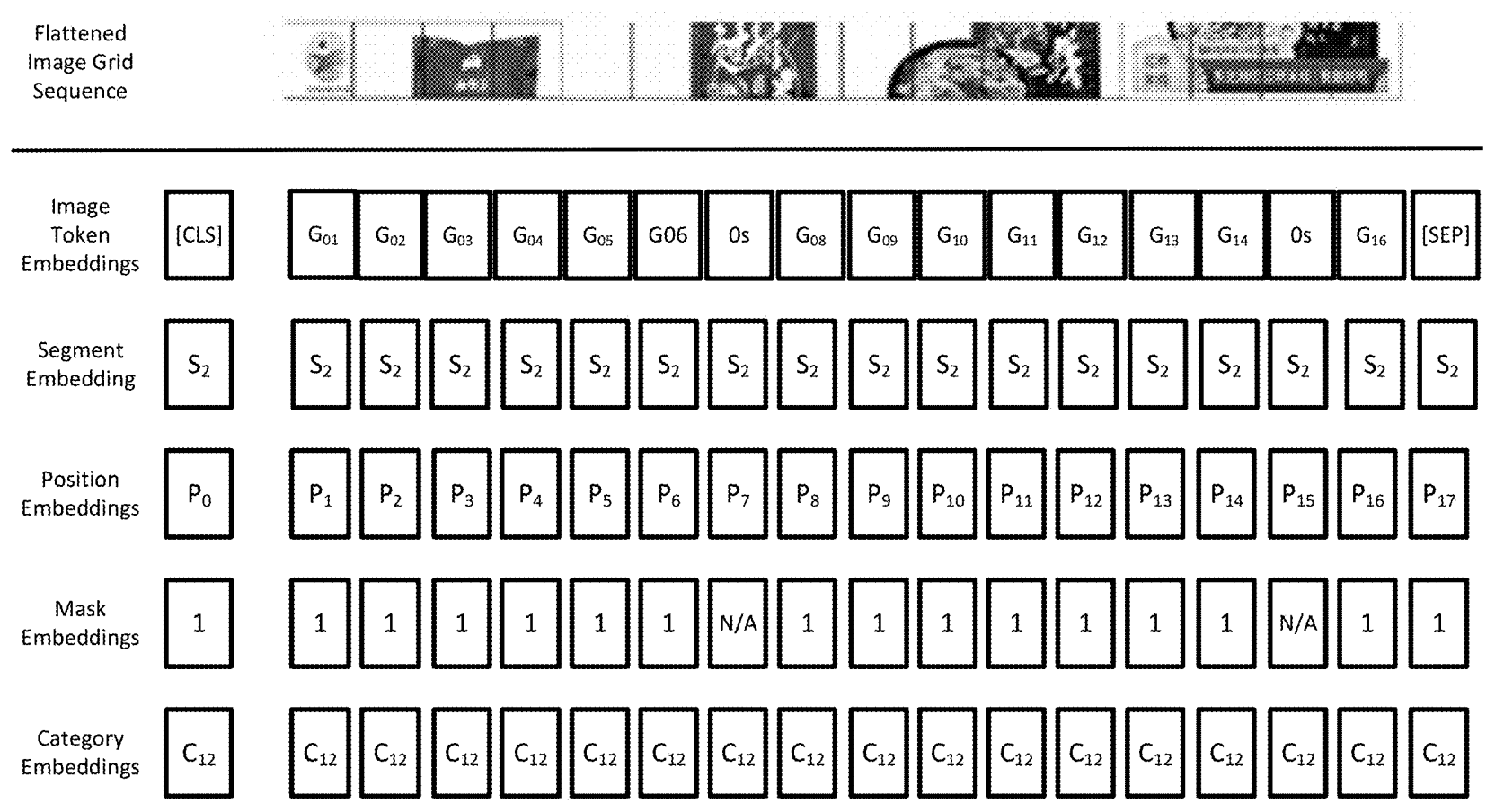

FIG. 7 schematically depicts the result from the product image embedding module 136, which in combination with the result from the product text embedding module 132, are used as input of the product transformer 138. As shown in FIG. 7, from the 16 image grids, by running the CNN, each image grid is given a vector value, and the 16 vectors are from $G_{01}$ to $G_{16}$. Each vector may have, for example, 1024 dimensions or 768 dimensions. The 16 grids come from the same image, are regarded as one sentence, and thus are given a same segment embedding $S_2$. The segment ID is different from the segment ID or IDs of the sentences from the product text embedding module 132, so as to differentiate the image from the sentences. The mask embeddings shows that 10-15% of the image token embeddings are randomly masked. In the example, the embeddings of the seventh grid and the fifteenth grid are masked. Therefore, the vector value $G_{07}$ and $G_{15}$ are now 0 in each of the dimensions. In addition, the product is classified in the $12^{th}$ product category, which is food, and the image token embeddings thus have a category embedding $C_{12}$. In certain embodiments, the category embedding may not be added here by the product image embedding module 136, but directly added by the product transformer 138 as one parameter before operating the transformer.

The product transformer 138 is configured to, upon receiving the product text embeddings and the product image embeddings, combine the embeddings into product embeddings, perform a transformer encoder operation on the product embeddings to update the product embeddings, extract hidden feature from the updated product embeddings, and send the extracted hidden feature to the relevance module 140. In certain embodiments, the product transformer 138 for analyzing the product text and image embeddings is inspired from "Attention is all you need." In certain embodiments, classic transformer encoder architect may be utilized. In certain embodiments, the product transformer 138 includes one or multiple BERT layers, such as three BERT layers, six BERT layers, or 12 BERT layers. The output of the product transformer 138 are hidden representations of product text and image. In certain embodiments, the product transformer 138 is configured to extract the hidden representation from the last layer of the product transformer as the final result, and send the extracted hidden representation to the relevance module 140. In certain embodiments, the extracted hidden representation is the first vector from the hidden representation.

Kindly note that transformer is a kind of deep learning model (design template) which is developed to process the input sequence feature and output another sequence feature. Generally speaking, the transformer consists of two parts: encoder and decoder. In certain embodiments of the present disclosure, the transformer 138 is an encoder part. In certain embodiments, the encoder 138 consists mainly of an attention layer, as well as some feed-forward layer. The feed-forward layer simply transforms each embedding in the input sequence individually, to provide them with more modeling capacity or change their dimensions.

The attention layer first multiplies the input sequence embeddings, E, with 3 weight matrices to convert the former into 3 different feature sequences, known as Query (Q), Key (K), and Value (V). These three are then combined to yield an output embedding sequence E' of the same length as input, via the following recipe:

take the dot product of $Q\_i$ and $K\_j$, for all j: $D\_\{ij\}=<Q\_i, K\_j>$ normalize these dot products through softmax operation: $W\_\{ij\}=e^\{D\_\{ij\}\}/sum\_k\ e^\{D\_\{ik\}\}$. Here k ranges from 1 to the sequence length.

take a weighted sum of the $V\_j$'s by the $W\_\{ij\}$: $E'\_i=sum\_j\ W\_\{ij\}\ V\_j$.

Thus $E'\_i$ is a weighted average of the $V\_j$'s, with weights provided by the pairing of Q and K.

In certain embodiments, the advantage of preserving the sequence length is that one can iterate the above process any number of times, allowing the model to get arbitrarily deep (expressive).

In another embodiment, before attention, an approach dealing with embedding sequences is to simply add up the embeddings to produce a single embedding, $E'=sum\_i\ E\_i$. Then E' is fed into a feed forward network (aka multilayer perceptron) to produce either a score or another embedding. The main disadvantage here is that the pairwise interaction between elements in the E sequence is not captured (at least not explicitly). In yet another embodiment, through the stacking of multiple attention/transformer layers, higher order interactions can also be captured.

The relevance module 140 is configured to, upon receiving the extracted hidden representation of the query from the query transformer 128 and the extracted hidden representation of the product from the product transformer 138, determine whether the query and the product are relevant based on the extracted hidden representation of the query and the product, and provide the relevance result to the user interface 142 when the query and the product are relevant. In certain embodiments, the relevance module 140 is a multilayer perceptron (MLP). The input for the MLP is the extracted hidden features of the query and the product, and the output is a relevance value. The extracted hidden features may be extracted from the last layer of the query transformer 128 or the product transformer 138, and may only include the head of the query or product hidden representations. The relevance value could be a true value in a range of 0-1, where 0 is not related and 1 is highly related. In certain embodiments, the relevance value could also be represented as the categories of related or not related. A threshold, for example 0.7, can be set in advance. If a relevance value equals to or is greater than 0.7, the relevance value is categorized as related, and if a relevance value is less than 0.7, the relevance value is categorized as not related. In certain embodiments, cross-entropy loss is utilized to minimize the loss. Particularly, the relevance is treated as a classification problem, where 1 means relevant, and 0 means irrelevant. Cross-entropy is used to minimize the loss to give the correct prediction.

The user interface 142 is configured to, upon receiving the relevant product from the relevance module 140, display the result to the customer who submitted the query through the interface. In certain embodiments, the user interface 142 may communicate with a terminal, such as a remote computing device or a smartphone of the customer, and display a graphic user interface (GUI) on the remote computing device or the smartphone. The customer can input and submit his query through the GUI, and the user interface 142 can display the query result on the GUI. In certain embodiments, the user interface 142 may be configured to only display the product when the product is relevant to the query. In certain embodiments, the product search application 118 would perform relevance analysis between the query and many or all of the products from the product database 144, rank the product based on their relevance to the query, and only display the top products to the customer. The top products have the highest relevance values to the query. The top products may be the top five products, the top ten products, or a number selected by the customer.

In certain embodiments, the product search application 118 may also include an order module, such that when the customer browses the query result and find one or a few products he wants to purchase, he can place the order through the order module. In certain embodiments, the product search application 118 may also include a clickable link to an order interface, and redirect the customer to the order interface to place the order for a selected product.

In certain embodiments, for the products in the product database 144, the product search application 118 may perform the text feature and image feature analysis by operating the product text feature module 130, the product text embedding module 132, the product image feature module 134, the product image embedding module 136, and the product transformer 138 on each of the products in advance. As a result, the hidden features from the transformers for each product can be extracted offline and stored. When a customer queries the products, the product application 118 only need to perform the functions of the modules 120 to 128, and then run the result against hidden features of each product in the relevance module 140. In certain embodiments, the customer may only provide text query, and there may be no need to perform the function of the query image feature module 124 and the query image embedding module 126.

Figure 8:
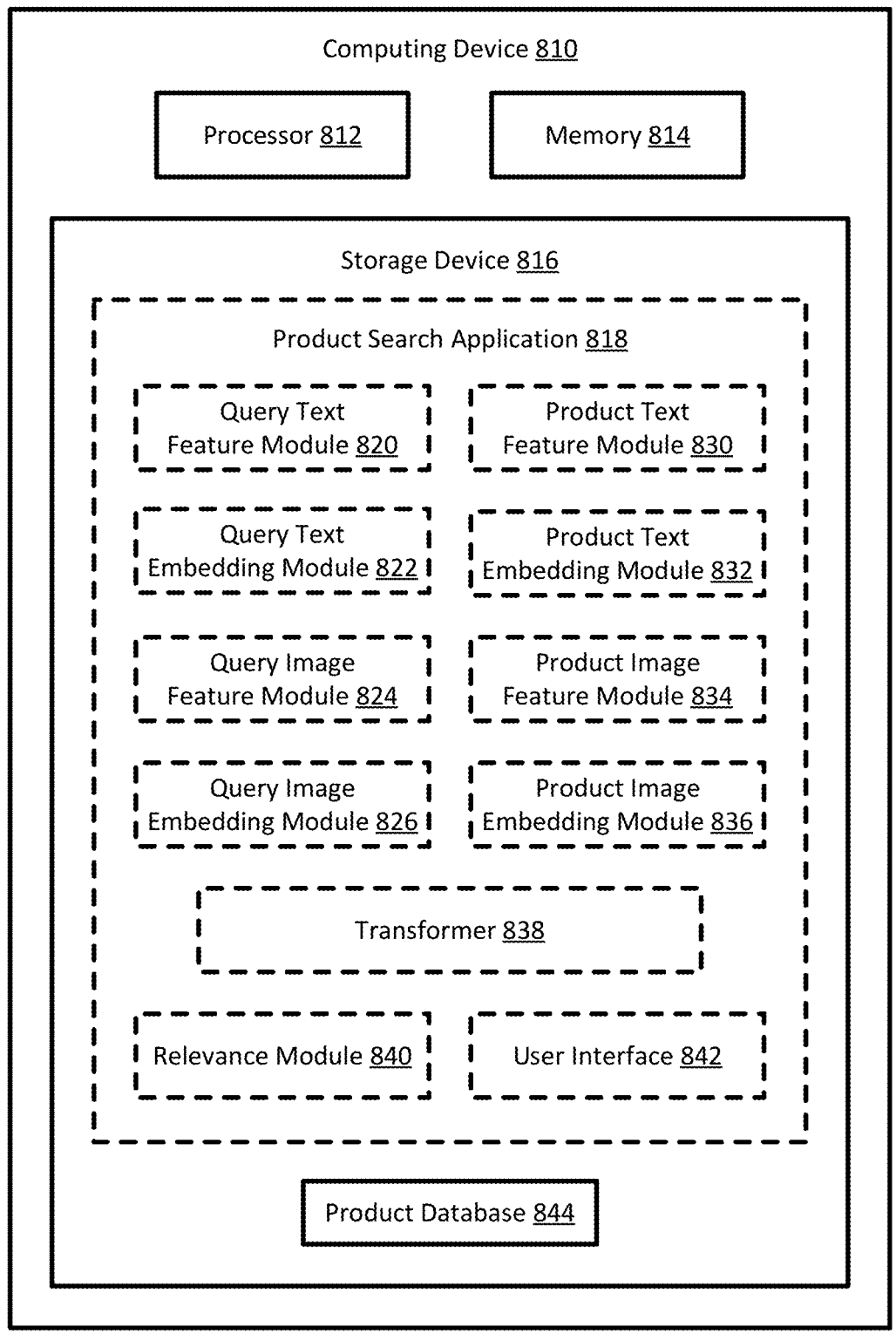
FIG. 8 schematically depicts a product search system according to certain embodiments of the present disclosure.

FIG. 8 schematically depicts a product query system according to certain embodiments of the present disclosure. The components in FIG. 8 are similar to the components in FIG. 1. The difference is that there is only one transformer 838 to receive input from the query text embedding module 822, the product text embedding module 832, the product image embedding module 836 and optionally the query image embedding module 826, and operate the transformer encoder using all those inputs. Both the designs in FIG. 1 and FIG. 8 roughly consist of three parts: query part, production part and the relevance calculation part. The double-stream design shown in FIG. 1 extracts query and product hidden features separately via transformer encoder. The advantage of it is that product features can be calculated off-line and so that on-line calculation workload can be reduced. But its accuracy is a little bit lower than single-stream design. On the other hand, the single-stream design shown in FIG. 8 concatenates query sequences and product information sequences together and extracts the joint feature together. Its accuracy is slightly better than double-stream but its on-line calculation load is also higher, which may create longer searching latency.

Figure 9:
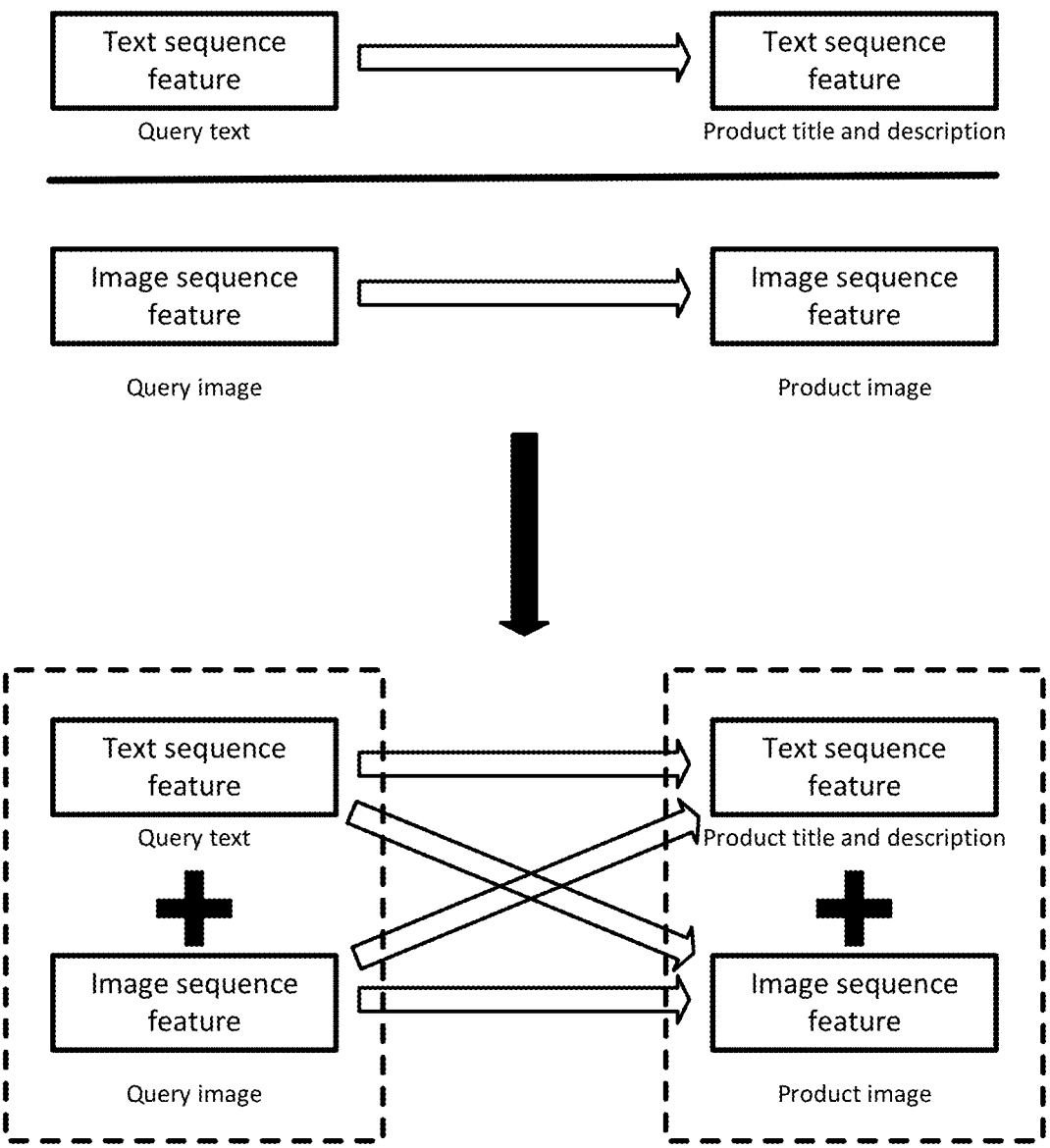
FIG. 9 schematically depicts improvement of a product search system according to certain embodiments of the present disclosure.

FIG. 9 schematically depicts the improvement of the design shown in FIG. 1 and FIG. 8 over the text-to-text and image-to-image search system according to certain embodiments of the present disclosure. The upper portion of FIG. 9 shows text-to-text search and image-to-image search according to certain embodiments of the present disclosure. In the search method pure based on texture feature via NLP, the method considers each word as a token and approximate a sentence as a sequence of embedded tokens via position embedding, segmentation embedding, and mask embedding. Such method receives big success to process text tasks. Searching engine can calculate relevance between query and title and then estimate query intent. But image information is missing in intent estimation calculation. In the search method purely based on image feature, the method employs the similarity score between high dimension image features of two images. The high dimensional features can be either extracted via Convolutional Neural Network (CNN), or via transformer encoder. Both methods compute a high dimensional tensor to represent the feature of the whole image. But the text information, such as text query or words of product description, is not unitized in relevance calculation. As shown in the lower portion of FIG. 9, by the design shown in FIG. 1 and FIG. 8, certain embodiments of the present disclosure can do cross-modality validation between image and text. Different from a text-to-text or image-to-image search system, the embodiments are able to handle mixture situations, such as text-to-image, image-to-text, and even more complex situations, such as text-to-(text+image), image-to-(text+image), and (text+image)-to-(text+image).

Referring back to FIG. 1, in certain embodiments, the product search application 118 may further include a scheduler, which is configured to schedule the data flow between the other modules of the product search application 118. The scheduler may determine training mode and searching mode of the product search application 118, load the retrieved product texts and product images to the memory 114, and call different modules to perform their function on the retrieved texts and images. In certain embodiments, the product search application 118 may further include a managing interface for an administer of the system to configure and adjust parameters of the modules, train the product search application 118 using the product texts and images from the product database 144, and using the well trained modules to provide search function to the customers. In certain embodiments, the administration function may also be incorporated into the user interface 142, and the user interface 142 is configured to provide the administration interface to the administrator and provide the user interface to the customers.

Figure 10:
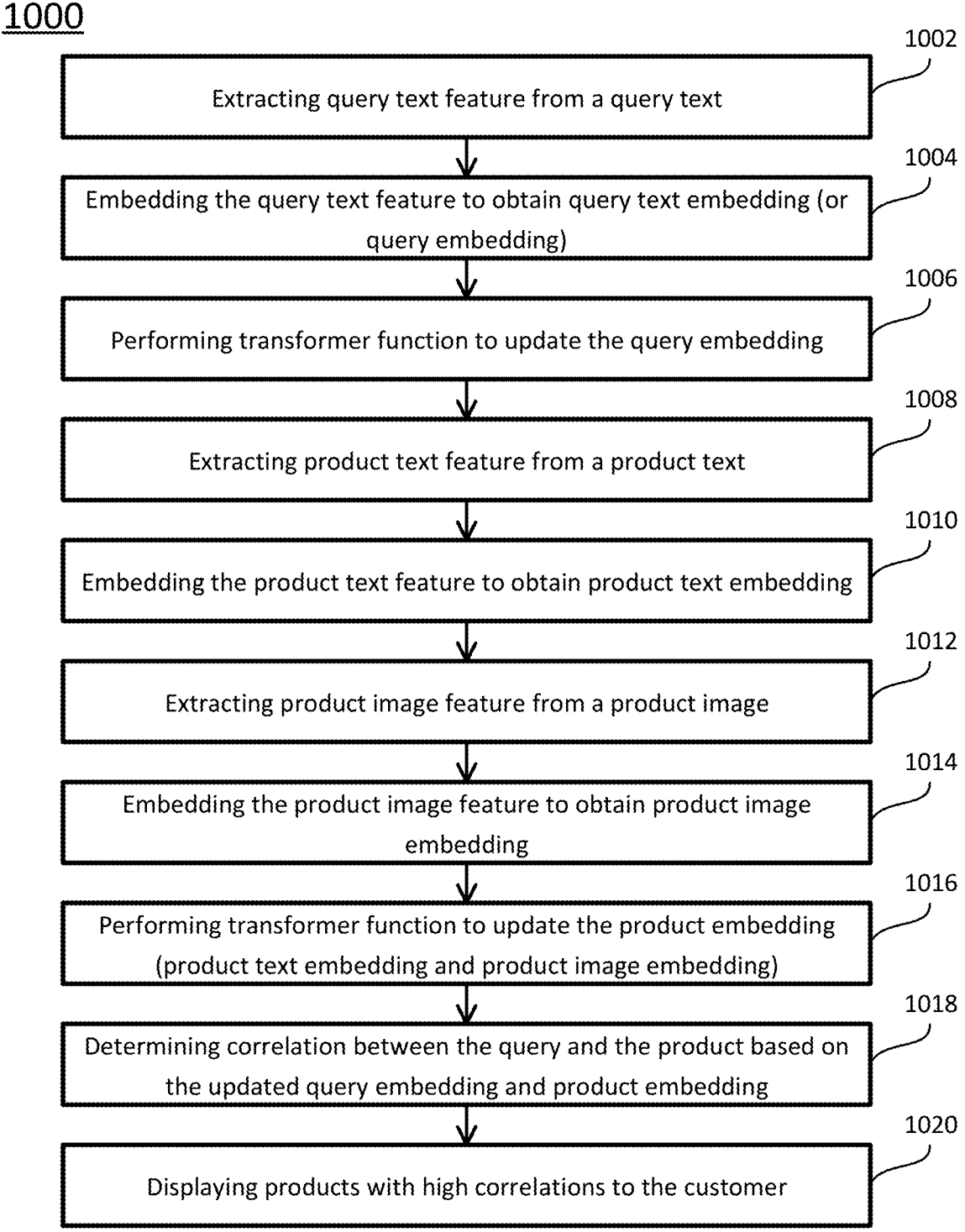
FIG. 10 schematically depicts a method for product searching according to certain embodiments of the present disclosure.

In certain aspects, the present disclosure relates to a method for product searching. FIG. 10 schematically depicts a method for product searching according to certain embodiments of the present disclosure. In certain embodiments, the method is implemented by the computing device 110 shown in FIG. 1. It should be particularly noted that, unless otherwise stated in the present disclosure, the steps of the method may be arranged in a different sequential order, and are thus not limited to the sequential order as shown in FIG. 10.

At procedure 1002, the query text feature module 120 receives a query text from a customer, extracts query text feature from the query text, and sends the extracted query text feature to the query text embedding module 122. In certain embodiments, the query text feature may be in the form of text token embeddings as shown in FIG. 2. In certain embodiments, the extraction is performed using word2vec, GloVe, fastTex, or other word embedding models. In certain embodiments, the extracted query text feature is in a form of vectors.

At procedure 1004, upon receiving the extracted query text feature, the query text embedding module 122 embeds the extracted query text feature to form the query text embeddings, and sends the query text embeddings to the query transformer 128. In certain embodiments, the embedding process may include adding segment embeddings, position embeddings, and mask embeddings to the query text feature. As a result, the query text embeddings may include the text token embeddings, segment embeddings, position embeddings, and mask embeddings. The query text embedding is also named query embedding when the query only includes text, but does not include image. When both query text and query image exist, the query embeddings are combination of query text embeddings and query image embeddings.

At procedure 1006, upon receiving the query embedding, the query transformer 128 uses the query embedding as the input of the transformer, operates the transformer to update the query embedding, and makes hidden representations of the query embeddings available to the relevance module 140. In certain embodiments, the query transformer 128 has one or multiple BERT layers. The updated query embedding includes hidden representations of the query, where the vector values are updated by multiple transformer layers.

When the customer provides a query including both the query text and a query image, the query image feature module 124 would also extract query image feature using a CNN model, add segment embedding, position embedding, mask embedding, and optionally category embedding, to form the query image embeddings, and send the query image embeddings to the query transformer 128. The query image embeddings are combined with the query text embeddings to form the query embeddings and the query embeddings are used as input of the query transformer 128.

At procedure 1008, the product text feature module 130 retrieves a product text from the product database 144, extracts product text feature from the product text, and sends the extracted product text feature to the product text embedding module 132. In certain embodiments, the product text includes title and description of the product. In certain embodiments, the product text feature may be in the form of text token embeddings as shown in FIG. 2. In certain embodiments, the extraction is performed using word2vec or other word embedding models.

At procedure 1010, upon receiving the extracted product text feature, the product text embedding module 132 embeds the extracted product text feature to form the product text embedding, and sends the product text embedding to the product transformer 138. In certain embodiments, the product text embedding may include the text token embeddings (product text feature), segment embeddings, position embeddings, and mask embeddings.

At procedure 1012, the product image feature module 134 retrieves a product image from the product database 144, extracts product image feature from the product image, and sends the extracted product image feature to the product image embedding module 136. In certain embodiments, the text and the image may be retrieved at the same time, and the text and the image correspond to the same product. In certain embodiments, the product image is the main image of the product. In certain embodiments, the product image feature may be in the form of image token embeddings as shown in FIG. 7. In certain embodiments, the extraction of the product image feature is performed using CNN.

At procedure 1014, upon receiving the extracted product image feature, the product image embedding module 136 embeds the extracted product image feature to form the product image embedding, and sends the product image embedding to the product transformer 138. In certain embodiments, the product image embedding may include the text token embeddings, segment embeddings, position embeddings, mask embeddings, and optionally the category embeddings as shown in FIG. 7.

At procedure 1016, upon receiving the product text embedding and the product image embedding, the product transformer 138 combines the product text embedding and the product image embedding to form a product embedding, operates the product transformer 138 using product embedding as input, and sends or makes the updated product embeddings available to the relevance module 140. The product text embedding and the product image embedding are derived from the same product.

At procedure 1018, the relevance module 140 retrieves hidden representation of the query from the query transformer 128 and hidden representation of the product from the product transformer 138, determines whether the query and the product are relevant, and provides the relevant value to the user interface 142. In certain embodiments, the hidden representations are extracted from the last layer of the query transformer 128 and the last layer of the product transformer 138, respectively. In certain embodiments, the relevance value is determined using an MLP.

At procedure 1020, the correlation between the query and many or all the products in the product database 144 are determined, and the relevance module 140 sends the products with top correlations to the user interface 142, such that the customer can view the ranked relevant products, and optionally order some of the relevant products if he is satisfied with some of the relevant products.

In certain embodiments, the steps 1008-1018 are performed iteratively for all the stored products in advance, such that when a query is provided, the product search application 118 only needs to run the query text feature module 120, the query text embedding module 122, the query transformer 128, the relevance module 140, the user interface 142. In certain embodiments, the product search application 118 may further need to run the query image feature module 124 and the query image embedding module 126 when the query also includes an image.

Figure 11:
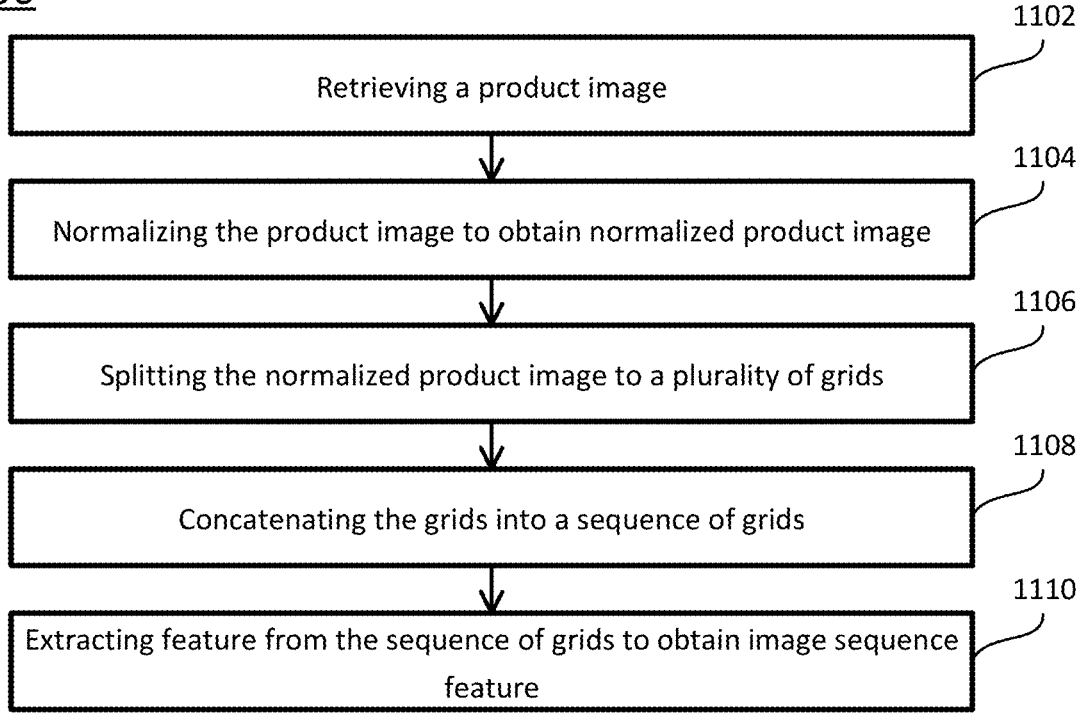
FIG. 11 schematically depicts a method for product image extraction according to certain embodiments of the disclosure.

FIG. 11 schematically depicts a method for product image extraction according to certain embodiments of the present disclosure. In certain embodiments, the method is implemented by the product image feature module 134 shown in FIG. 3. It should be particularly noted that, unless otherwise stated in the present disclosure, the steps of the method may be arranged in a different sequential order, and are thus not limited to the sequential order as shown in FIG. 3.

At procedure 1102, the product image retrieval module 1340 retrieves a product image from the product database 144, and sends the retrieved product image to the product image normalization module 1342.

At procedure 1104, upon receiving the retrieved product image, the product image normalization module 1342 normalizes the product image to obtain normalized product image, and sends the normalized product image to the product image splitting module 1344.

At procedure 1106, upon receiving the normalized product image, the product image splitting module 1344 splits the normalized product image into product image grids, and sends the product image grids to the product image concatenation module 1346.

At procedure 1108, upon receiving the product image grids, the product image concatenation module 1346 flattens the grids, concatenates the grids into a sequence of product image grids, and sends the sequence of product image grids to the product image feature extraction module 1348.

At procedure 1110, upon receiving the sequence of the product image grids, the product image feature extraction module 1348 extracts feature from each of the grids to form extracted product image features, and sends the extracted product image features to the product image embedding module 136. In certain embodiments, the product image feature extraction module 1348 sends the extracted product image feature to the product image position embedding module 1360 of the product image embedding module 136.

Figure 12:
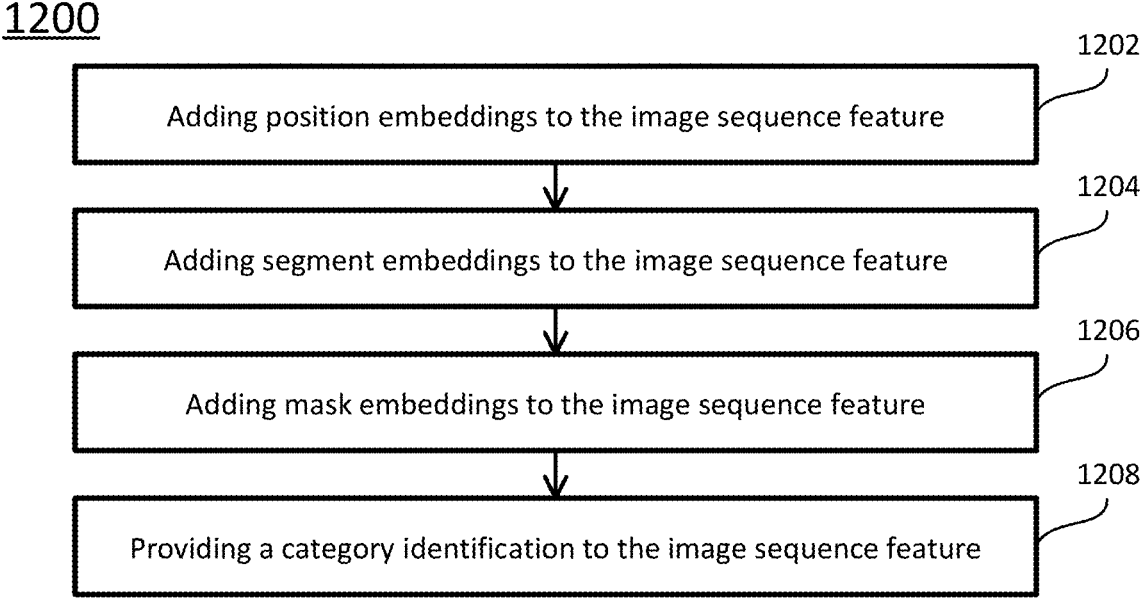
FIG. 12 schematically depicts a method for product image embedding according to certain embodiments of the disclosure.

FIG. 12 schematically depicts a method for product image embedding according to certain embodiments of the present disclosure. In certain embodiments, the method is implemented by the product image embedding module 136 shown in FIG. 5. It should be particularly noted that, unless otherwise stated in the present disclosure, the steps of the method may be arranged in a different sequential order, and are thus not limited to the sequential order as shown in FIG. 5.

At procedure 1202, upon receiving the extracted product image feature, the product image position embedding module 1360 adds a position embeddings to the product image feature, and sends the product image feature and the position embeddings to the product image segment embedding module 1362.

At procedure 1204, upon receiving the product image feature and the position embedding module 1360, the product image segment embedding module 1362 adds the segment embeddings to the product image feature, and sends the product image feature, the position embeddings, and the segment embeddings to the product image mask embedding module 1364.

At procedure 1206, upon receiving the product image feature, the position embeddings, and the segment embeddings, the product image mask embedding module 1364 adds the mask embedding to the product image feature, and sends the product image feature, the position embeddings, the segment embeddings, and the mask embeddings to the product image category embedding module 1366.

At procedure 1208, upon receiving the product image feature, the position embeddings, the segment embeddings, and the mask embeddings, the product image category embedding module 1366 adds the category embedding to the product image feature, and sends the product image feature, the position embedding, the segment embedding, the mask embedding, and the category embedding to the product transformer 138. In certain embodiments, the incorporation of the category ID is performed using an MLP.

The adding of position embeddings, segment embeddings, and mask embeddings may be performed in parallel or in any sequence. The providing of the category ID may be performed by the product image embedding module 136 or the product transformer 138. The product image feature, the position embedding, the segment embedding, the mask embedding, and the category embedding are combined as the product image embedding. The product text embeddings and the product image embeddings are combined as product embeddings.

In certain aspects, the present disclosure relates to a non-transitory computer readable medium storing computer executable code. The code, when executed at a processor of a computing device, may perform the methods as described above. In certain embodiments, the non-transitory computer readable medium may include, but not limited to, any physical or virtual storage media. In certain embodiments, the non-transitory computer readable medium may be implemented as the storage device 116 of the computing device 110 as shown in FIG. 1.

Certain embodiments of the present disclosure, among other things, have the following beneficial advantages. (1) First, the present disclosure provides an end-to-end model capable for cross-domain relevance calculation. The model is designed to accept flexible inputs, including text-to-text search, image-to-image search, and more advanced text-to-(text+image), image-to-(text+image), text-to-image, image-to-text, and (text+image)-to-(text+image). (2) Second, the present disclosure approximates an image feature into a feature sequence similar as text sequence, so that features from different domains can be concatenated and fed into a transformer model. Specifically, a given product image is first split into non-overlapping grid patches. Each gird patch is approximated as a language word. Then, the grid patches are flattened into a sequence. In such a way, an image is viewed as a language sentence. After that, image feature extraction through CNN is conducted to each grid patch. A feature from a grid patch serves as one language token in NLP field. Finally, position embedding, segmentation embedding, and mask embedding are conducted to these image features as the similar way how language features are processed. As a result, the approximation of the image procession to the textual procession breaks the wall between the image domain and the textual domain.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A computer-implemented method for searching a product corresponding to a query from a customer, comprising:
    embedding the query to obtain a query embedding;
    retrieving product information comprising a product text and a product image;
    embedding the product text to obtain a product text embedding, embedding the product image to obtain a product image embedding, and combining the product text embedding and the product image embedding to obtain a product embedding, wherein the product image embedding has a same format as the product text embedding,
    wherein embedding the product image comprises: normalizing the product image to obtain a normalized product image; splitting the normalized product image into a plurality of grids: concatenating the plurality of grids into a sequence of grids; and extracting product image feature from the sequence of grids to obtain a grid token for each of the sequence of grids,
    wherein embedding the product image further comprises: adding a position vector to each of the grid tokens, the position vectors representing positions of the grids in the sequence of grids; adding a segment vector to each of the grid tokens, the segment vectors representing identification of the product image: adding a mask vector to each of the grid tokens, wherein values of the mask vectors are 0 or 1, and value of one of the grid tokens is converted to 0 when the value of corresponding one of the mask vectors is 0; and defining a category identification, the category identification representing category of the product in an e-commerce platform, wherein the product embedding comprises the grid tokens, the position vectors, the segment vectors, the mask vectors, and the category identification;
    subjecting the query embedding and the product embedding to a transformer to determine whether the query and the product are relevant; and
    providing the product as a search result of the query when the query and the product are relevant.

2. The method of claim 1, wherein the transformer comprises a query transformer for processing the query embedding and a product transformer for processing the product embedding.

3. The method of claim 1, wherein the query comprises a query text and a query image, and the query embedding comprises a query text embedding corresponding to the query text and a query image embedding corresponding to the query image.

4. The method of claim 1, wherein about 10-15% of the mask vectors have a value of 0.

5. The method of claim 1, wherein the step of extracting the product image feature from the sequence of grids comprises performing a convolutional neural network (CNN) on each of the grids, and the transformer is a pre-trained bidirectional encoder representations from transformers (BERT).

6. A system for searching a product corresponding to a query from a customer, wherein the system comprises a computing device, the computing device comprises a processor and a storage device storing computer executable code, and the computer executable code, when executed at the processor, is configured to:

embed the query to obtain a query embedding;
retrieve product information comprising a product text and a product image;
embed the product text to obtain a product text embedding, embed the product image to obtain a product image embedding, and combine the product text embedding and the product image embedding to obtain a product embedding, wherein the product image embedding has a same format as the product text embedding,
wherein the computer executable code is configured to embed the product image by: normalizing the product image to obtain a normalized product image; splitting the normalized product image into a plurality of grids; concatenating the plurality of grids into a sequence of grids; and extracting product image feature from the sequence of grids to obtain a grid token for each of the sequence of grids,
wherein the computer executable code is further configured to embed the product image by: adding a position vector to each of the grid tokens, the position vectors representing positions of the grids in the sequence of grids; adding a segment vector to each of the grid tokens, the segment vectors representing identification of the product image; adding a mask vector to each of the grid tokens, wherein values of the mask vectors are 0 or 1, and value of one of the grid tokens is converted to 0 when the value of corresponding one of the mask vectors is 0; and defining a category identification, the category identification representing category of the product in an e-commerce platform, wherein the product embedding comprises the grid tokens, the position vectors, the segment vectors, the mask vectors, and the category identification;
subject the query embedding and the product embedding to a transformer to determine whether the query and the product are relevant; and
provide the product as a search result of the query when the query and the product are relevant.

7. The system of claim 6, wherein the transformer comprises a query transformer for processing the query embedding and a product transformer for processing the product embedding.

8. The system of claim 6, wherein the query comprises a query text and a query image, and the query embedding comprises a query text embedding corresponding to the query text and a query image embedding corresponding to the query image.

9. The system of claim 6, wherein about 10-15% of the mask vectors have a value of 0.

10. The system of claim 6, wherein the computer executable code is configured to extract the product image feature from the sequence of grids by performing a convolutional neural network (CNN) on each of the grids, and the transformer is a pre-trained bidirectional encoder representations from transformers (BERT).

11. A non-transitory computer readable medium storing computer executable code, wherein the computer executable code, when executed at a processor of a computing device, is configured to:
embed the query to obtain a query embedding;
retrieve product information comprising a product text and a product image;
embed the product text to obtain a product text embedding, embed the product image to obtain a product image embedding, and combine the product text embedding and the product image embedding to obtain a product embedding, wherein the product image embedding has a same format as the product text embedding,
wherein the computer executable code is configured to embed the product image by: normalizing the product image to obtain a normalized product image; splitting the normalized product image into a plurality of grids; concatenating the plurality of grids into a sequence of grids; and extracting product image feature from the sequence of grids to obtain a grid token for each of the sequence of grids,
wherein the computer executable code is further configured to embed the product image by: adding a position vector to each of the grid tokens, the position vectors representing positions of the grids in the sequence of grids; adding a segment vector to each of the grid tokens, the segment vectors representing identification of the product image; adding a mask vector to each of the grid tokens, wherein values of the mask vectors are 0 or 1, and value of one of the grid tokens is converted to 0 when the value of corresponding one of the mask vectors is 0; and defining a category identification, the category identification representing category of the product in an e-commerce platform, wherein the product embedding comprises the grid tokens, the position vectors, the segment vectors, the mask vectors, and the category identification;
subject the query embedding and the product embedding to a transformer to determine whether the query and the product are relevant; and
provide the product as a search result of the query when the query and the product are relevant.

* * * * *